(12) United States Patent
Gutierrez, Jr.

(10) Patent No.: US 7,305,609 B2
(45) Date of Patent: Dec. 4, 2007

(54) M-ARY MODULATION FOR WIRELESS SYSTEMS

(75) Inventor: Alberto Gutierrez, Jr., Plano, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 962 days.

(21) Appl. No.: 10/349,637

(22) Filed: Jan. 23, 2003

(65) Prior Publication Data

US 2003/0110440 A1    Jun. 12, 2003

Related U.S. Application Data

(63) Continuation of application No. 09/218,220, filed on Dec. 22, 1998, now abandoned.

(60) Provisional application No. 60/079,825, filed on Mar. 30, 1998.

(51) Int. Cl.
*H03M 13/03* (2006.01)
(52) U.S. Cl. ........................... 714/790; 714/752
(58) Field of Classification Search ................ 714/752, 714/786, 790; 375/261, 265
See application file for complete search history.

(56) References Cited

U.S. PATENT DOCUMENTS

| 5,497,401 A | * | 3/1996 | Ramaswamy et al. | ...... 375/341 |
| 5,555,260 A | * | 9/1996 | Rinnback et al. | ........... 370/347 |
| 5,781,542 A | * | 7/1998 | Tanaka et al. | ............... 370/342 |
| 6,078,625 A | * | 6/2000 | McCallister et al. | ........ 375/261 |
| 6,131,180 A | * | 10/2000 | Ramesh | ...................... 714/790 |

FOREIGN PATENT DOCUMENTS

| EP | 0 848 515 A2 | 6/1998 |
| EP | 0 888 021 A1 | 12/1998 |
| JP | 8 163085 | 7/1998 |
| WO | WO 94/11955 | 5/1994 |
| WO | WO 97/15131 | 4/1997 |
| WO | WO 97/21294 | 6/1997 |
| WO | WO 97/45976 | 12/1997 |

OTHER PUBLICATIONS

Seiichi Sampei et al., Adaptive Modulation/TDMA Scheme for Personal Multi-Media Communication Systems, Nov. 28, 1994, pp. 989-993, Faculty of Engineering, Osaka University.
Hidehiro Matsuoka et al., Adaptive Modulation System With Punctured Convolutional Code for High Quality Personal Communication Systems, Nov. 6, 1995, pp. 22-26, Faculty of Engineering, Osaka University, Communications Research Laboratory, MPT, Tokyo, Japan.

(Continued)

*Primary Examiner*—Guy Lamarre
*Assistant Examiner*—Esaw T. Abraham
(74) *Attorney, Agent, or Firm*—Carr LLP (57) ABSTRACT

Disclosed is a method of and apparatus for increasing the capacity of a wireless communication system. This is accomplished by having users that can support a higher than base modulation order be required to do so under predetermined conditions such as electrical distance from a base transceiver station (BTS) antenna to a user, the reception of data in a high speed burst (HSD) and the like. The same digital processor apparatus that may be used to provide a base order modulation scheme may be reprogrammed in a more complex fashion to provide signal processing at the higher modulation rate for any given user channel.

13 Claims, 4 Drawing Sheets

OTHER PUBLICATIONS

Mustafa Eroz et al., A Multiple Trellis-Coded Hybrid-ARQ Scheme for Land Mobile Communication Channels, Nov. 6, 1995, pp. 496-500, Electrical Engineering Department, Institute for Systems Research, University of Maryland at College Park.

Hidehiro Matsuoka et al., Adaptive Modulation System With Variable Coding Rate Concatenated Code for High Quality Multi-Media Communication Systems; Apr. 28, 1996; pp. 487 491, Faculty of Engineering, Osaka University, Osaka, Japan; Communications Research Laboratory, MPT, Tokyo, Japan.

* cited by examiner

M-ARY MODULATION FOR WIRELESS SYSTEMS

This Application is a continuation of U.S. application Ser. No. 09/218,220, filed 22 Dec. 1998 now abandoned, which is a continuation-in-part of and claims the benefit of U.S. Provisional Application No. 60/079,825, filed 30 Mar. 1998.

TECHNICAL FIELD

The present invention relates in general to variable modulation order and in particular to methods and systems for providing a wireless system which adjusts the modulation order of data being transmitted to the various users in a wireless system on an individual user basis.

BACKGROUND

Wireless communication systems have, in recent years, seen a tremendous growth surge. Advances in signal processing, driven by the demand for high speed data as well as improvements in spectral efficiency (such as for voice users), have made the balance between radio capacity and available user channels more complicated. For example, recent standards and equipment modification proposals relating to the use of high speed data (HSD) will further contribute to the problem. Such units will be capable of receive and/or transmit operations on multiple channels such as supplemental channels, a fundamental channels and dedicated control channels simultaneously.

In cellular systems, code channel availability as well as overall system capacity can be increased when cells are made ever smaller (more cells in a given area), however, various issues, including cost, efficiency and interference from transmissions in other cells, prevent such action from being a total solution.

In code division multiple access (CDMA) systems, the number of users that can be accommodated is a function of the available code channels. Typically, CDMA systems use Walsh codes, a set of orthogonal codes, where the number of codes available equals the chip rate divided by the data rate. Channels encoded with Walsh codes are called "Walsh channels" or "code channels." It is desirable to use orthogonal codes in the forward link (FL) since much of the inter-channel interference cancels when orthogonal codes are used. As should be apparent, the FL comprises communication from the base transceiver station (BTS) to the mobile station (MS).

Typically, spread-spectrum communications systems such as CDMA, employ pseudo-random noise (PN) codes for spreading the communication signal to the desired bandwidth. As is well known in the art, a PN code is comprised of chips where a chip may be equated to a unit of time duration. A PN sequence of chips may be used in CDMA as a scrambling code. Following data modulation via a phase shift keyed output signal of a given modulation order, prior art CDMA, PCS and cellular communication systems, added Walsh codes and PN spreading combined in a well known manner. Known systems have used binary phase shift keyed (BPSK) and quadrature phase shift keyed (QPSK) modulation orders.

In general there are N orthogonal codes for a code of length N bits (chips). This also applies to Walsh codes, wherein there are N length N orthogonal Walsh codes. It may be noted that the PN chip rate is the same as the Walsh chip rate. In order to have consistent numerology the PN chip rate must equal the modulation symbol rate times the Walsh code length in chips.

In the design of some prior art systems using QPSK, a data rate into the encoder of 9,600 symbols per second, and a PN chip rate of 1.2288 Mcps (mega chips per second) allowed for 128 code channels to be transmitted simultaneously from a BTS antenna when the radio environment supports that many users (or user channels).

PCS and cellular communications systems often encounter various types of radio environments. For example, the radio signal may encounter various degrees of fading due to multipath and mobile velocities. Other factors such as shadowing may also cause a reduction of signal strength between transmitter and receiver. These same obstacles may also cause signal reflection which results in multipath signals that tend to confuse the receiver in determining what signal to detect. Some of these problems may be overcome by increasing the power of the transmitted signal. In view of the above, the radio environment may be such that the BTS (forward link) runs out of transmitter power before the number of code channels (Walsh codes) available are exhausted. It is generally deemed desirable for the radio environment to limit the system capacity rather than the number of available code channels. However, there may be situations in a given system when the available Walsh channels are exhausted before the BTS power limit is reached. In this case, the capacity of the system is artificially limited by the Walsh code channels rather than the radio environment.

BPSK (modulation order of 2) systems are simpler to implement than are QPSK systems since the signal processing complexity is greater for the latter. While an 8 or other higher order system might immediately come to ones mind as a way to solve the problem of having an adequate number of Walsh codes, other considerations must be addressed. If the transmissions employ higher order modularity (M>4), then all users must purchase new equipment to use the system. Further, the transmissions must remain orthogonal in order for the system to be usable and/or practical, numerology must be accommodated and so must FEC coding. Just because BPSK and QPSK systems proved to be capable of providing orthogonality, does not mean that higher order modulation schemes are also orthogonal. With proper design, the result of which will be revealed below, these considerations can be satisfied. Therefore, it would be desirable to use a higher modulation order system when both the radio environment and the mobile capability can support a higher modulation order.

SUMMARY OF THE INVENTION

The present invention comprises providing a wireless system, such as CDMA, which uses a base modulation order such as QPSK when the system user capacity is adequate and using a higher order modulation scheme for selected users when code channels are limited.

BRIEF DESCRIPTION OF THE DRAWINGS

For a more complete understanding of the present invention, and its advantages, reference will now be made in the following Detailed Description to the accompanying drawings, in which.

DETAILED DESCRIPTION

Figure 1:
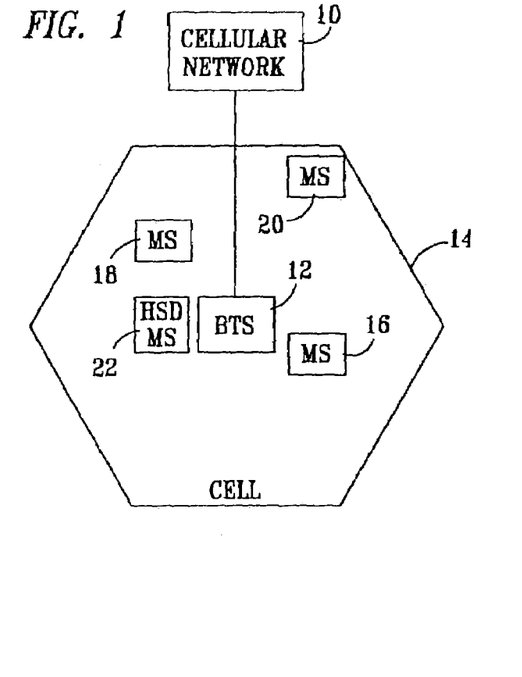
FIG. 1 is a simplified diagram of a cellular system.

In FIG. 1, a cellular network, represented by block 10, communicates with a BTS 12. In general, a BTS may also communicate with MSs in neighboring cells. The BTS 12 transmits signals to various MSs within a defined distance as represented by the outlines of a cell 14. The BTS 12 transmits these signals via an antenna not shown. Within cell 14 are shown MSs 16, 18 and 20 with MS 16 being physically and electrically close to the BTS 12. It is common knowledge that a user can be physically close to a BTS antenna and still not have a "good", strong and/or clear signal. Thus further references to the distance between an MS and a transmitting antenna of a BTS such as 12 will by definition refer to "close" as having a strong and easily detectable signal when a small amount of power is used to transmit signals to that MS. In the alternative, an MS is "far" from an antenna when the signal received by the MS is weak in strength and/or hard to accurately detect even though a relatively large amount of power is used to transmit signals to that MS. In other words, many different factors such as terrain, atmospheric conditions, buildings and so forth could result in MS 18, for example, being electrically farther away than MS 20 which is physically located near the extreme edge of cell 14. An additional MS 22 is shown, where MS 22 is capable of receiving and/or transmitting HSD.

Figure 2:
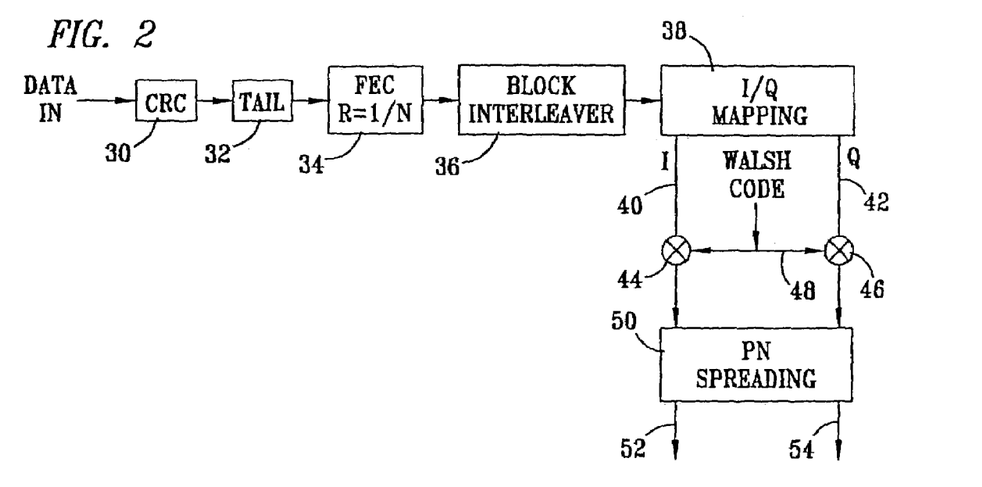
FIG. 2 is a block diagram illustrating how Walsh codes and PN spreading are typically combined with incoming data in a CDMA system.

In FIG. 2, payload data is input to a Cyclic Redundancy Check (CRC) block 30 which adds to the total data transmitted. Additional data bits are inserted by a tail block 32. In one prior art system, the data rate at the output of block 32 was 9600 bps (bits per second). The output of block 32 is applied to a forward error correction (FEC) circuit block 34. For example, when code rate (R) is ½ (1/N=½), the output of block 34 is applied at a rate of 19,200 bps to a block interleaver 36 which performs a reordering of the bits comprising each frame of data passing through the block. The output of block 36 remains at the 19,200 bps rate and is applied to an inphase and quadrature phase (I/Q) mapping block 38 where 2 bits of data at a time are used to define in-phase and quad-phase output signals on leads 40 and 42 respectively. These outputs occur at a 9600 sps (symbols per second). The leads 40 and 42 are connected respectively to combining or multiplying means 44 and 46 respectively. A Walsh code is supplied on a lead 48 to a second input of each of the means 44 and 46. The outputs of the multipliers 44 and 46 are supplied to a PN spreading block 50, which has in- and quad-phase outputs on leads 52 and 54 respectively.

Figure 3:
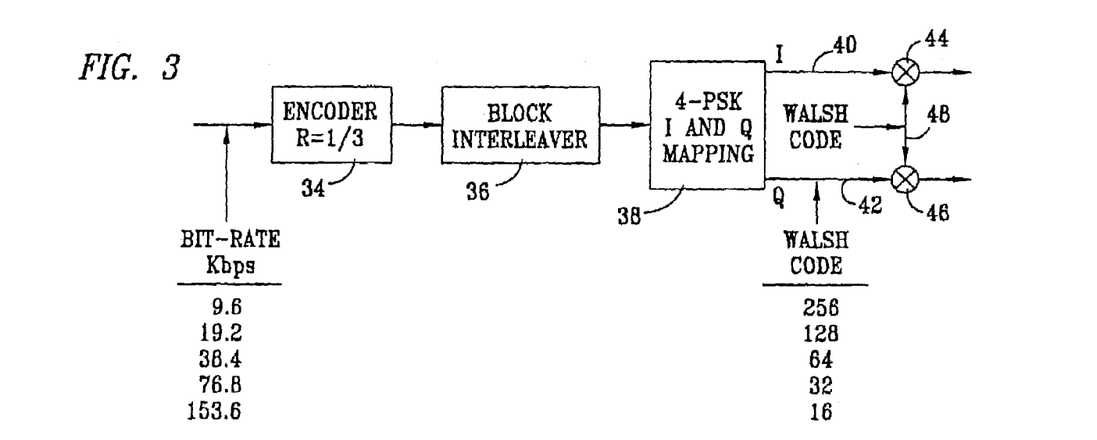
FIG. 3 provides more detail for a portion of FIG. 2 when QPSK modulation is used.

FIG. 3 repeats a portion of FIG. 2 and shows blocks 34 through 46 utilizing the same designators. FIG. 3 illustrates in addition that as the bit rate into the encoder is increased, the Walsh code length and accordingly the number of user channels that can be accommodated with a system decreases.

Figure 4:
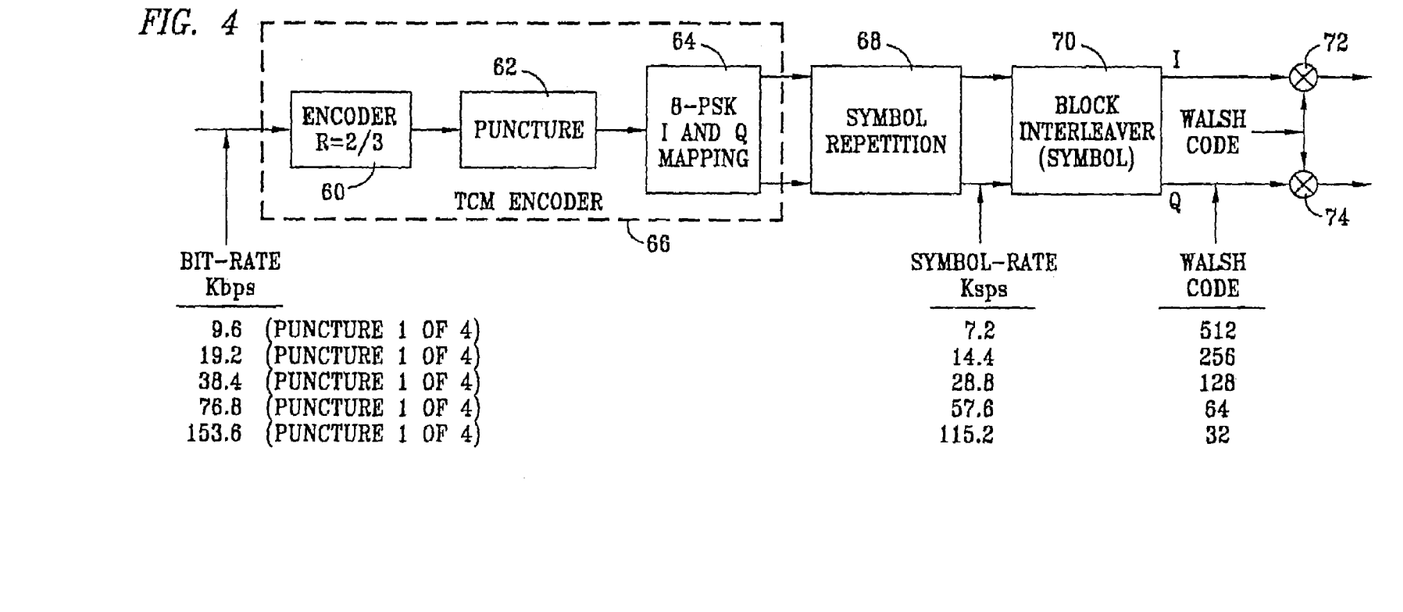
FIG. 4 illustrates one approach to performing 8-PSK modulation while using the data input of the 4-PSK of FIG. 3 and utilizing longer Walsh codes, with respect to those used for 4-PSK, for a given data rate.
Figure 5:
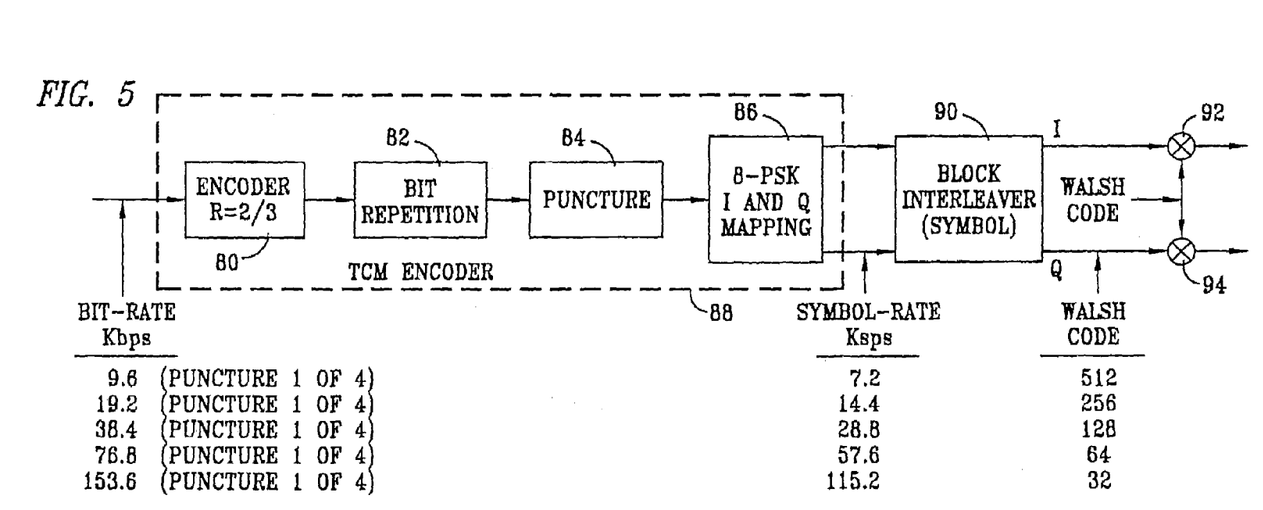
FIG. 5 illustrates a second approach to performing 8-PSK modulation while using the data input of FIG. 3 (corresponding to 4-PSK) and utilizing longer Walsh codes, with respect to those used for 4-PSK, for a given data rate.
Figure 6:
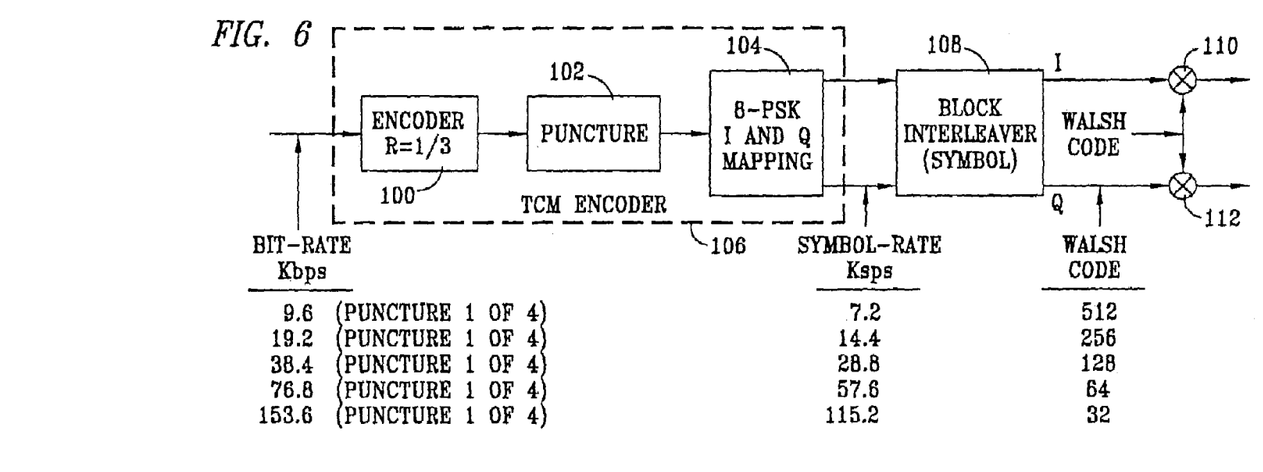
FIG. 6 illustrates a third approach to performing 8-PSK modulation while using the data input of FIG. 3 (corresponding to 4-PSK) and utilizing longer Walsh codes, with respect to those used for 4-PSK, for a given data rate.

FIG. 4 shows a single user channel having identical bit rate inputs as presented in FIG. 3 while employing a higher order modulation in order to increase the Walsh code lengths, as compared to FIG. 3, and thus increase the number of user channels available in the system. The approach presented in this figure, and the following FIGS. 5 and 6, is unique and was originated to utilize the same bit rate as presently used in the prior art. In the following explanation, the input will be assumed to be 9.6 kilo bits per second (kbps). The example of FIG. 4 shows 8-PSK but similar techniques would allow the use of even higher order modulation, for example, 16-PSK or 16-QAM, or higher. An encoder 60, having a code rate of ⅔, in contrast to the code rate ⅓ as in FIG. 3, passes its 14.4 kbps output signal to a puncture block 62, where a selected one of each 4 bits is removed before passing the resulting 10.2 kbps bit stream to an 8-PSK mapping block 64. The 8 PSK mapping uses 3 bits per symbol to provide an output of only 3.6 ksps (kilo symbols per second). The blocks 60, 62 and 64 are enclosed with a dash line to indicate the TCM Encoder portion of this circuitry where TCM is an acronym for Trellis Coded Modulation. In order to get the rate up to an amount necessary to obtain the proper Walsh code, each symbol is duplicated in a symbol repetition block 68 to obtain a symbol rate of 7.2 ksps. It is noted that the symbol repetition is optional. Alternately, if the symbols are not repeated then the Walsh code lengths can be doubled for each of the respective data rates. Of course, the longer Walsh code lengths support more user channels, however, there are other considerations which might impact this choice. For example, due to the coherence time of the channel, a shorter or longer Walsh code may be desired. A symbol block interleaver 70 then interleaves the symbols, followed by Walsh coding via multipliers 72 and 74. A simple mathematical examination will prove that this process allows at least twice the number of user channels for a given payload data input rate as obtained with 4-PSK (QPSK). Note that without the symbol repetition, block 70, four times the user channels are allowed. It may also be shown, either by testing or mathematics, that the summation of all the channels are orthogonal and provide the desired cancellation effect.

For QPSK, such as set forth in FIG. 3, the quadrature bit stream (i.e., in-phase and quadrature channels), is equivalent to two BPSK bit streams, one on the in-phase and one on the quadrature channel. Thus, in such a case, at the receiver, inverse mapping, with respect to the I/Q mapping shown in FIG. 3, is employed followed by decoding of the FEC encoded data stream. In contrast, however, for higher modulation orders (i.e., M>4), the inverse of I/Q mapping is not as straightforward with respect to optimal detection of the FEC code. Therefore, the channel coding and modulation are combined (as is well understood in the art), whereby a Trellis code is employed at the transmitter, as shown in FIG. 4.

It is noted that a rate n/(n+1) (e.g., rate ⅔) Trellis code is readily available in the literature. In the subsequent description, various methods are identified for obtaining a desired code rate for the trellis codes, other than R=n/(n+1), which is compatible with the present invention. The optimal method for rate matching of the TCM encoding, however, will be a function of the Trellis Code design and thus the preferred method among those methods described herein (i.e., FIGS. 4-7) should be chosen accordingly. The rate matching methods described herein are symbol repetition, bit repetition, and puncturing. Puncturing is a method by which 1/m (m a positive integer larger than zero) bits or symbols are removed from the information stream in a prescribed fashion. For example, suppose the bit rate into an FEC block is n/(n+1), repetition of each bit (original plus one copy), followed by puncturing 1 of m bits. Then, the bit rate following the puncturing is given by $$2 \cdot \frac{1}{R} \cdot \frac{m-1}{m}.$$

In contrast, a code rate R=1/n FEC code for BPSK or QPSK modulation (M≦4) are readily available, as well as puncturing patterns.

In FIG. 5, an encoder 80, a bit repetition block 82, a puncture block 84, and an 8-PSK mapping block 86 form a TCM encoder 88. In this figure, the bits, prior to puncturing, are repeated rather than the symbols such that the output bit rate of block 82, assuming a bit rate into encoder 80 is 9.6 Kbps, is 28.8 Kbps. Removing ¼ of these bits results in a bit rate of 21.6 ksps at the input of block 86. In block 86, combining 3 bits per symbol produces the indicated output symbol rate of 7.2 Ksps. A block 90 and the associated multipliers 92 and 94 perform in the same manner as shown in FIG. 4.

In FIG. 6, an encoder 100, a puncture block 102 and an 8-PSK mapping block 104 comprise the TCM encoder 106. Since the code rate in block 100 is ⅓, the output of the encoder 100 is already at 28.8 kbps and thus repetition is not required (i.e., to get the correct bit rate to block 104), as occurred in FIG. 5. A block interleaver 108 and multipliers 110 and 112 operate as did similar blocks in FIG. 5. It may be noted that FIG. 6 is based on a ⅓ rate FEC code, so therefore, the resulting TCM code may require development beyond that which is available in the current literature. If such development is required, it is believed straightforward for those skilled in the art along the lines of established mathematical methods.

Figure 7:
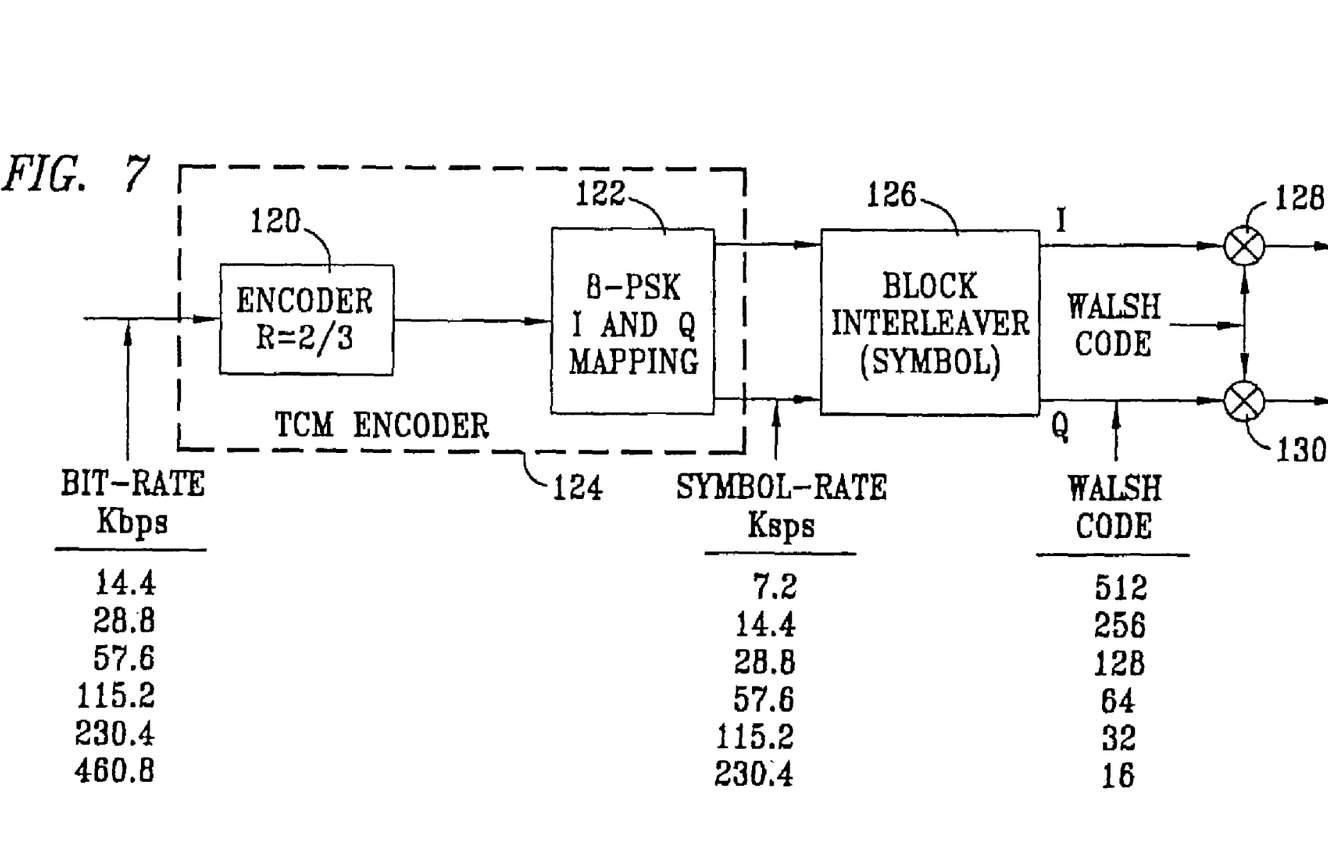
FIG. 7 illustrates a fourth approach to performing 8-PSK modulation while utilizing longer Walsh codes, with respect to those used for 4-PSK, for a given data rate.

In FIG. 7, an encoder 120 and an 8-PSK mapping block 122 form a TCM encoder 106. In this figure, no puncturing is required since the code rate in block 120 is ⅔ and thus its output is 21.6 kbps with an input bit rate of 14.4 kbps. In block 122, combining 3 bits per symbol produces the indicated output symbol rate of 7.2 Ksps. An interleaver block 126 and its associated multipliers 128 and 130 perform in the same manner as shown in FIG. 5. Although the bit rate input shown in FIG. 7 varies from that presently used in QPSK CDMA systems, this approach has definite advantages in not requiring the puncturing of FIGS. 4-6 or the repetition action of FIGS. 4 and 5. FIG. 7 further uses presently available technology in that encoder 120 uses R=⅔. Finally, the straightforward architecture of FIG. 7 is able to accommodate a given number of codes with a higher input data rate than occurs in FIGS. 4-6. It should be noted that a single digital processor chip may be programmed or configured to perform the functions required by the circuitry blocks shown in each of the FIGS. 3, 4, 5, 6 and 7. In other words, a digital processor may be programmed (or reprogrammed) to create either a base modulation order such as BPSK, 4-PSK or a higher modulation order such as 8 or 16 and provide the required orthogonal output.

With the above in mind, it should be apparent that a wireless network can be designed such that any given user channel may operate at either some system base modulation rate such as QPSK or at a higher modulation order. For example, the BTS unit may output several channels, where each of the individual code channels employ any of the aforementioned modulation orders, while all the code channels still maintain orthogonality with respect to one another. This alternate operational mode may be obtained, when circumstances require and/or the radio environment permits, by reprogramming the appropriate digital processor performing the function illustrated in any of the FIGS. 3-7.

A BTS has data available to the BTS as to how close electrically any given MS is to an antenna. For example, the power transmitted to an MS in a CDMA system may be adjusted to a level necessary to obtain good reception by an MS in accordance with data (or some indicator) returned to the BTS from the MS. This tends to optimize the system for power radiated by a BTS antenna as well as helping minimize interference between user channels. For example, depending on the complexity of the Trellis codes (i.e., complexity with respect to TCM code states), if the power required in supplying signals to a given MS is low compared to other MSs, it should be a good candidate for receiving signals using a higher modulation order. Such a determination is even more important when a given MS is provided data in the form of a high data rate since a large number of channels may be required for such an action.

While it is believed that the use of a higher order modulation for even some of the MS users in a system will allow more user channels to be active, some numerical examples will be set forth.

It may be assumed that a HSD user in a single order 4-PSK system such as presented in FIG. 3 is assigned a Walsh code length of 4 where the base Walsh length is 256 as shown in the first line of FIG. 3. Although the user communicates at a very high rate, that single user consumes ¼ of the total Walsh codes. In such a situation, the system supports 1 HSD user +¾ of 256 other code channels for a total of 193 users (for the purpose of this explanation, a code channel is equated to a user).

If this HSD user operates in a system as set forth in the present invention where one or more channels may employ a higher modulation order than a base modulation order, then significantly more users may be accommodated. It may be assumed that the HSD user is electrically close enough to the BTS that the user may readily support a modulation order of 8 based on a Walsh length of 512. For a given total data rate, a Walsh length of 8 in such a system is equivalent to a Walsh length of 4 when the modulation order is 4. Thus a HSD user that can support 8-PSK would only consume ⅛ of the total 512 codes available. It may be noted that a "normal" (base modulation order—QPSK) user, effectively uses two 512 codes. Based upon the above description this system may support 1 HSD user +⅞ (512/2) for a total of 1+224 or 225 users. This increases the code channels by 32, where the only user of the higher modulation order is a single HSD unit.

Some of the regular users may also support a higher order transmission rate. It should thus be apparent that the maximum number of available orthogonal code channels can be significantly increased over that obtainable from prior art systems that supported only a single modulation order.

The present invention has been described primarily with respect to CDMA using 4-PSK as a base modulation order and 8-PSK as an alternate modulation order for some or all of the channels when the radio environment supports the higher modulation order. However, the invention is believed to cover all wireless systems, which may use different modulation orders in accordance with various factors including, but not limited to, the radio environment.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It is therefore, contemplated that the claims will cover any such modifications or embodiments that fall within the true scope and spirit of the invention.

What is claimed is:

1. A method for increasing throughput in a wireless telecommunication network, comprising the steps of:
   using a base modulation order for all users communicating with a given base station;
   determining, under predetermined conditions, if given users support communication at a higher modulation order than said base modulation order;
   communicating with at least one of said given users the higher modulation order; and
   wherein the predetermined conditions comprises one of
   (1) a given percentage of total radio capacity and/or code capacity being used;
   (2) requiring high-speed data users to operate at a higher modulation order than the base modulation order; and
   (3) requiring users closer to a communicating antenna to operate at a higher modulation order than other users physically further from the communicating antenna.

2. A method for increasing throughput in a wireless telecommunication network, comprising the steps of:
   determining if a user can support communication at a higher modulation order than a base modulation order; and
   communicating with the user at the higher modulation order;
   wherein the higher modulation order is performed by one of the step sequences comprising:
   a1) n/(n+1) encoding an incoming signal to provide a second signal where n is a positive integer greater than 0;
   a2) puncturing by removing 1 of each set of m bits of said second signal to produce a third signal, where m is a positive non-zero integer; and
   a3) in phase and quad phase mapping said third signal to provide fourth and fifth signals as outputs or
   b1) n/(n+1) encoding an incoming signal to provide a second signal;
   b2) repeating the bits of said second signal to produce a third signal;
   b3) removing 1 of each set of m bits of said third signal to produce a fourth signal, where m is a positive non-zero integer; and
   b4) in phase and quad phase mapping said fourth signal to provide fifth and sixth signals as outputs, or
   c1) 1/n encoding an incoming signal to provide a second signal;
   c2) removing 1 of each set of m bits of said second signal to produce a third signal, where m is a positive non-zero integer; and
   c3) in phase and quad phase mapping said third signal to provide fourth and fifth signals as outputs.

3. The method of claim 2 wherein m=4.

4. A cellular transmitter apparatus in a wireless telecommunication network, comprising:
   means to communicate with a first modulation scheme;
   means to communicate with a second modulation scheme; and
   logic circuitry for selecting between the first and the second modulation schemes;
   wherein the means to communicate with a first modulation scheme comprising one of:
   a1) a n/(n+1) encoder where n is positive integer greater than 0;
   a2) a puncture means for removing bits for an output signal of said a n/(n+1) encoder in accordance with a predetermined function; and
   a3) an in phase and quad phase mapping means for mapping signals output by said puncture means, or
   b1) a n/(n+1) encoder where n is positive integer greater than 0;
   b2) a bit repeating means for duplicating each bit output by said a n/(n+1) encoder;
   b3) a puncture means for removing bits for an output signal of said bit repeating means in accordance with a predetermined function; and
   b4) an in phase and quad phase mapping apparatus for mapping signals output by said puncture means, or
   c1) a 1/n encoder;
   c2) a puncture means for removing bits for an output signal of said a 1/n encoder in accordance with a predetermined function; and
   c3) an in phase and quad phase mapping means for mapping signals output by said puncture means.

5. A cellular transmitter apparatus in a CDMA network, comprising:
   means to communicate with a first modulation scheme;
   means to communicate with a second modulation scheme; and
   logic circuitry for selecting between the first and the second modulation schemes;
   wherein the means to communicate with a first modulation scheme comprising:
   where n is a positive integer greater than 0
   a n/(n+1) encoder where n is positive integer greater than 0;
   a puncture means for removing bits for an output signal of said a n/(n+1) encoder in accordance with a predetermined function;
   in phase and quad phase mapping means for mapping signals output by said puncture means;
   a symbol repetition means for duplicating the symbols output by said in phase and quad phase mapping means;
   a block interleaver means for reordering in phase and quad phase symbols output by said symbol repetition means; and
   a combining means for altering the output of said block interleaver means to a given Walsh code.

6. A method for increasing throughput in a CDMA network, comprising the steps of:
   using a base modulation order for all users communicating with a given base station;
   determining, under predetermined conditions, if given users support communication at a higher modulation order than said base modulation order; and
   communicating with at least one of said given users at the higher modulation order;
   wherein the higher modulation order is performed by the steps of:
   n/(n+1) encoding an incoming signal to provide a second signal where n is a positive integer greater than 0;

puncturing by removing 1 of each set of m bits of said second signal to produce a third signal, where m is a positive non-zero integer; and in phase and quad phase mapping said third signal to provide fourth and fifth signals as outputs.

7. The method of claim 6 wherein m=4.

8. A method for increasing throughput in a wireless network, comprising the steps of:

establishing a base modulation order for all users communicating with a given base station; and requiring users electrically closest to said given base station, such users support communication at a higher modulation order than said base modulation order, to use a higher modulation order than other users electrically farther away from said given base station;

wherein the higher modulation order is performed by the steps of:

n/(n+1) encoding an incoming signal to provide a second signal where n is a positive integer greater than 0;

puncturing by removing 1 of each set of m bits of said second signal to produce a third signal, where m is a positive non-zero integer; and in phase and quad phase mapping said third signal to provide fourth and fifth signals as outputs.

9. The method of claim 8 wherein m=4.

10. A method for increasing throughput in a wireless network, comprising the steps of:

establishing a base modulation order for all users communicating with a given base station; and requiring users electrically closest to said given base station, such users support communication at a higher modulation order than said base modulation order, to use a higher modulation order than other users electrically farther away from said given base station;

wherein the higher modulation order is performed by the steps of:

n/(n+1) encoding an incoming signal to provide a second signal where n is a positive integer greater than 0;

repeating the bits of said second signal to produce a third signal;

removing 1 of each set of m bits of said third signal to produce a fourth signal, where m is a positive non-zero integer; and in phase and quad phase mapping said fourth signal to provide fifth and sixth signals as outputs.

11. The method of claim 10 wherein m=4.

12. A method for increasing throughput in a wireless network, comprising the steps of:

establishing a base modulation order for all users communicating with a given base station; and requiring users wanting to send high speed data to do so at a higher modulation order than said base modulation order;

wherein the higher modulation order is performed by the steps of:

n/(n+1) encoding an incoming signal to provide a second signal where n is a positive integer greater than 0;

repeating the bits of said second signal to produce a third signal;

removing 1 of each set of m bits of said third signal to produce a fourth signal, where m is a positive non-zero integer; and in and phase mapping said fourth signal to provide fifth and sit signals as outputs.

13. The method of claim 12 wherein m=4.

* * * * *